Dec. 3, 1963  W. F. WANNER  3,112,757
PRESSURE CONTROL AND UNLOADER WITH AIR ELIMINATOR CONTROL BUTTON
Filed Sept. 17, 1962
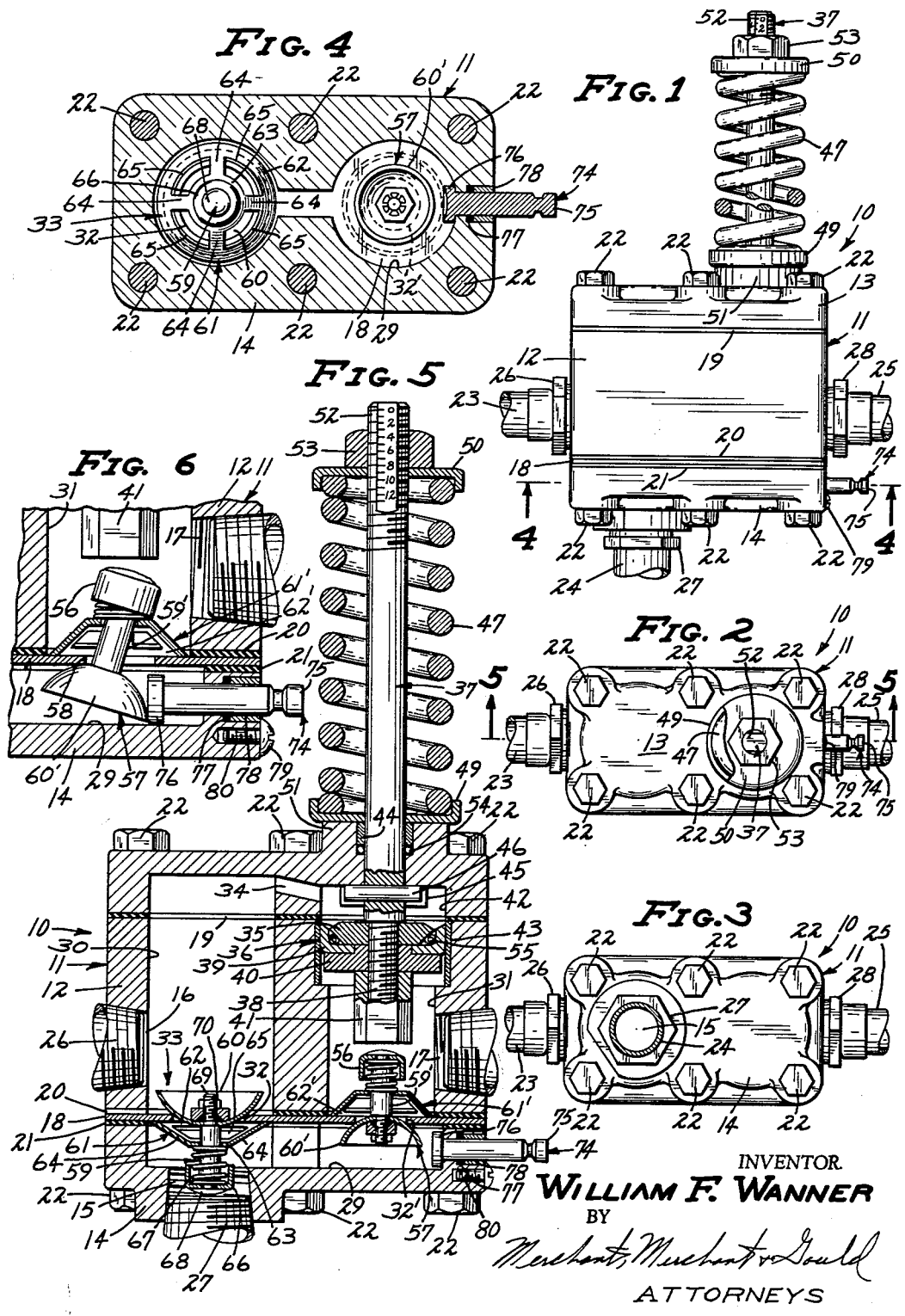
INVENTOR
WILLIAM F. WANNER
BY
Merchant, Merchant & Gould
ATTORNEYS

3,112,757
PRESSURE CONTROL AND UNLOADER WITH AIR ELIMINATOR CONTROL BUTTON

William F. Wanner, Minneapolis, Minn., assignor to Seeger-Wanner Corporation, Minneapolis, Minn., a corporation of Minnesota
Filed Sept. 17, 1962, Ser. No. 224,070
3 Claims. (Cl. 137—108)

This invention relates to a priming device for purging air from a pressure control and unloader assembly and pump system.

It is an object of this invention to provide a simple but reliable means for priming a pump in a system where liquid is drawn to a pump through a suction line and fed therefrom through an inlet line to a pressure control and unloader assembly from which through a discharge line such liquid is delivered for use and also from which an overflow line optionally returns to a vented tank-type source of supply, the pressure control and unloader assembly functioning to limit pressure in the discharge line to a preset maximum value above which such liquid being pumped is by-passed through the overflow line.

It is another object of this invention to provide a means for priming a pump and suction line in a system of the type described whereby depression of a button on a pressure control and unloader assembly allows air in the suction line and pump to pass out through the overflow line and, when air has been eliminated, automatically closes off the overflow line and brings the discharge line up to full pressure.

It is another object of this invention to provide a priming device for a pressure control and unloader assembly in a system of the type described.

It is another object of this invention to provide a priming device for a pressure control and unloader assembly used in a system where pump and engine therefor operate intermittently under load conditions only when the discharge line from the pressure control and unloader assembly is open but in which such line pressure is continuously maintained.

It is another object of this invention to provide a priming device for a pressure control and unloader assembly in a system of the class described which can be used after the system is primed to manually unload the pump and power source.

Other and further objects of this invention will become apparent to those skilled in the art from a reading of this specification and attached drawings in which:

FIG. 1 is an elevational view of a priming device of the invention mounted for use in a pressure control and unloader assembly;

FIG. 2 is a top view of the embodiment shown in FIG. 1, parts thereof being broken away;

FIG. 3 is a bottom view of the embodiment shown in FIG. 1;

FIG. 4 is a horizontal sectional view taken along the line 4—4 of FIG. 1;

FIG. 5 is a vertical sectional view taken along the line 5—5 of FIG. 2; and

FIG. 6 is an enlarged sectional view of the priming device of the invention showing operation thereof.

The operation and structure of the check valve of this invention suitable for use with the pressure control and unloader assembly of this invention will be explained first. Referring to FIG. 5, there is shown a valve plate 18, which has a circular aperture 32 therein. A stem 59 extends loosely through said aperture 32. A cup-shaped valve element 60 is mounted on the stem 59. The radius of curvature of cup-shaped valve element 60 preferably corresponds to that of a sphere and the stem 59 joins valve element 60 at the latter's apex. The convex outer wall of cup-shaped valve element 60 seats in aperture 32. The valve is conveniently formed of a metal such as stainless steel.

On the opposite side of valve plate 18 from that on which cup-shaped valve element 60 seats is positioned a spider 61. Spider 61 is composed of a rim portion 62, a hub portion 63, and spokes 64 which connect said rim portion 62 with said hub portion 63 and which define ports 65 for fluid passage therethrough.

As those skilled in the art will appreciate that in place of the described spider one could employ as a support element any means, for example, even a rod-shaped element journalling said stem 59, which will function to support and suspend the cup-shaped valve element 60.

Compression spring 67 provides a yielding means extending between the hub portion 63 of spider 61 and the rear end 68 of stem 59 urging stem 59 in a direction to seat valve element 60 in aperture 32. Mounted over the rear end 68 of stem 59 is a cup 66. Cup 66 provides a convenient platform against which force can be exerted to unseat valve element 60, thereby permitting liquid to pass through aperture 32. Cup 66 also provides a spring retainer for spring 67. This cup is conveniently fitted over a restricted end region of the rear end of stem 59, and then the end 68 of stem 59 is simply peened over and riveted against the cup 66. The sides of cup 66 serve to minimize interference of the fluid flow past the spring 67. The cup 66 also limits the extent to which the valve element 60 may be opened, since the sides of cup 66 butt up against the hub portion 63 of spider 61 after valve element 60 is unseated from the valve plate 18.

To fasten the cup-shaped valve element 60 upon the forward end 69 of stem 59, there is conveniently employed a castle nut 70 having a tapered seat. Between castle nut 70 and cup-shaped valve element 60 is positioned an O-ring which circumscribes said stem 59. This O-ring performs a triple service, in that it provides a seal for the joint between the cup-shaped valve element 60 and stem 69; it closes in against the threads on stem 59 as castle nut 70 is drawn down (since the O-ring is located in the tapered seat of nut 70), thereby acting as a lock to prevent the nut 70 from slaking off the stem 59; and it acts as a cushion to absorb the shock resulting from the deceleration of the mass of the stem 59 upon the valve plate 18 and to absorb the shock resulting from the deceleration of the valve mass upon the opening of the cup-shaped valve element 60.

The operation of the check valve is identical for first and second check valve means 33 and 57 respectively. The operation of the check valve will be described with reference to second check valve means 57. The prime numbers in this following description indicate corresponding parts on check valve 57 which are described herein for first check valve 33. As shown in FIG. 6, check valve 57 is operable independently of the angle which stem 59' makes with valve plate 18 as long as the convex wall of valve element 60' can establish seating engagement with valve plate 18 at aperture 32' (i.e., as long as the stem 59' is not tilted so far that the lip of cup-shaped element 60' comes to rest in aperture 32'). In the embodiment shown, angular movement of stem 59' is limited by selecting a spider 61' whose rim portion 62' butts against a wall of casing 11 whenever stem 59' is tilted more than a desired predetermined angle. As those skilled in the art will appreciate, for similar reasons the valve element 60' is self-seating. Thus, for example, when the valve element 60' is upset or removed from seating engagement with aperture 32' by the ram end 76 of priming button 74 and then permitted to reseat itself in accordance with the teachings of this invention, the valve element 60' seats in aperture 32' even though the stem 59' is tilted at an angle with the vertical. The valve element 60' is self-cleaning because as valve element 60' seats, it tends to brush particles aside and/or to cut fibrous materials caught between the edge of aperture 32' and the flat surface of valve element 60'.

In FIG. 1 is seen an embodiment of a hydraulic pressure control and unloader assembly of the invention, herein designated in its entirety by the numeral 10. This assembly 10 has a casing 11 which is composed of a midsection 12, a top portion 13, and a bottom portion 14.

In the walls of casing 11 are an input inlet 15, a discharge outlet 16, and an overflow outlet 17.

Between the bottom portion 14 of casing 11 and the mid-portion 13 of casing 11 is positioned a valve plate 18. In order to obtain a seal between the top portion 13 of casing 11 and the mid-section 12 of casing 11, as well as between valve plate 18 and, respectively, the mid-section 12 of casing 11 and the bottom portion 14 of casing 11, gaskets 19, 20 and 21 are employed. The top portion 13 of casing 11 and the bottom portion 14 of casing 11 are each respectively bolted to the mid-section 12 of casing 11 by bolts 22. Casing 11 is suitably formed of a metal, such as cast aluminum, and valve plate 18 of a metal such as stainless steel. A discharge line 23 is connected to discharge outlet 16 by means of threaded fitting 26; an input line 24 is connected to input inlet 15 through threaded fitting 27; and an overflow line 25 is connected to overflow outlet 17 by means of threaded fitting 28.

Referring to FIG. 5, it is seen that the interior of casing 11 defines four chambers, to wit, an inlet chamber 29, a valve chamber 30, a discharge chamber 31 and plunger chamber 42. Between inlet chamber 29 and valve chamber 30 extends valve plate 18. An aperture 32 provides a passageway between inlet chamber 29 and valve chamber 30 and an aperture 32' provides a passageway between inlet chamber 29 and discharge chamber 31. A first check valve, herein designated in its entirety by the numeral 33, is fitted around aperture 32 so as to control fluid passage therethrough. While no special check valve means need be employed here, the first check valve means 33 shown here is preferred. Its operation has been described supra. Suffice it here to say that this first check valve means 33 permits unidirectional flow of fluid from said inlet chamber 29 into said valve chamber 30 and is operably responsive to fluid pressure in said inlet chamber 29. First check valve 33 opens in response to fluid pressure in inlet chamber 29, thereby permitting passage of fluid from inlet chamber 29 into valve chamber 30. Thus, liquid supplied by a pump (not shown) enters inlet chamber 29 through input inlet 15 from input line 24, passes through first check valve means 33 into valve chamber 30 and exits through discharge outlet 16 into open discharge line 23.

Pressure in valve chamber 30 is transmitted through channel 34 and is impressed on the diaphragm 35 of a pressure-responsive plunger assembly herein designated in its entirety by the numeral 36. Pressure-responsive plunger assembly 36 utilizes a plunger rod 37, both ends of which are threaded. A diaphragm 35 is slipped over threaded forward end 38 of plunger 37, followed by plunger chamber, sealing gasket 39 and diaphragm guide 40. Diaphragm 35, sealing gasket 39 and diaphragm guide 40 are held in place on plunger 37 by hexagonal plug nut 41 which screws over the threaded forward end 38 of plunger 37. Plunger chamber 42 is provided in casing 11 for the pressure-responsive plunger assembly 36 to move up and down in. This chamber is circular in cross-section and, in the region where the sealing gasket 39 on plunger 37 moves to and fro, the chamber 42 is fitted with a smooth faced sleeve 43 enabling sealing gasket 39 to engage sleeve 43 in liquid-tight relationship.

In order to prevent plunger 37 from rotating, the top central region of chamber 42 is allowed to be integral with the top portion 13 of casing 11, so as to leave a sort of disc-shaped projection 45 in plunger chamber 42 depending from top portion 13 of casing 11. This discshaped projection 45 is slotted to receive a bar or tube 46 which pierces plunger 37 along a diameter. Then, as the plunger 37 moves upwards and downwards, bar or tube 46 rides in the slot (not clearly shown in FIG. 5) of disc-shaped projection 45, thereby preventing plunger 37 from rotating. To prevent escape of fluid from plunger chamber 42, there is employed O-ring seal 54. Between O-ring seal 54 and flange 51 is positioned a sleeve 44. To cause the walls of sealing gasket 39 to engage sleeve 43, there is employed O-ring 55.

The force exerted by fluid pressure on the diaphragm 35 of the pressure-responsive plunger assembly 36 is counter-balanced by compression spring 47. Compression spring 47 has its ends housed in cups 49 and 50. The center of each cup 49 and 50 has a hole (not shown) so as to permit each cup to slip over the outside walls of plunger 37. Cup 49 rests on flange 51 of top portion 13 of casing 11. The rear end 52 of plunger 37 is threaded and calibrated so that when a nut 53 is screwed onto plunger 37 and compression spring 47 is compressed, the downward force exerted on plunger 37 can be conveniently observed. Note that the amount of counterbalancing force which spring 47 can exert upon plunger 37 in response to fluid pressure upon diaphragm 35 can be varied by compressing spring 47 to a greater or lesser extent by means of adjusting nut 53.

The region generally below sealing gasket 39 can fill with fluid and comprises the discharge chamber 31 as noted above. When plunger 37 moves downward in response to predetermined fluid pressure in valve chamber 30, nut 41 on plunger 37 presses against cup 56 of a second check valve herein designated in its entirety by the numeral 57. The operation of the second check valve 57 is similar to that of the preferred first check valve and is described herein above. Suffice it here to say that when plunger 41 presses against cup 56 of second check valve 57, check valve 57 opens, permitting fluid or liquid in inlet chamber 29 to flow therefrom into discharge chamber 31. Fluid in discharge chamber 31 exits therefrom through overflow outlet 17 into overflow line 25.

Thus, as plunger 37 progresses downward, it opens second check valve 57 allowing part of the liquid supplied by the pump to overflow, as to return to a reservoir tank (not shown). The valve opening aperture 32' of second check valve 57 is controlled by the second check valve means 57 so that when second check valve 57 is opened, the amount of such opening is modulated by the extent to which plunger 37 moves downward. Hence, opening valve 57 controls pressure in the system. The force developed on the plunger 37 correlates with the compression setting of the spring 47. The pressure of the system is controlled by modulating the amount of liquid overflowing and passing out through overflow outlet 17. Thus, pressure regulation is obtained using the pressure control and unloader assembly 10.

Mounted in the side of the bottom portion 14 of casing 11 adjacent second check valve 57 is a priming button designated herein in its entirety by the numeral 74. Priming button 74 has a head 75 and at the other (interior) end a ram end 76. To provide a liquid-tight seal between priming button 74 and bottom portion 14 of casing 11, an O-ring seal 77 is employed between button 74 and bottom portion 14. O-ring seal 77 is positioned in place behind a sleeve 78. Sleeve 78 is conveniently held in place by the round head 79 of machine screw 80 which screws into an appropriate threaded hole of bottom portion 14 of casing 11.

When priming button 74 is depressed, as by manual pressure exteriorly applied, the ram end 76 of button 74 contacts the cup-shaped valve element 81 of second check valve 57, unseating same from aperture 32'. If air is in the pump system and a priming operation is therefore intended as when the system is to be made operational, when valve 57 is opened by button 74, air enters inlet chamber 29 through input inlet 15 and passes on through aperture 32' into discharge chamber 31 from whence it exits through overflow outlet 17 into overflow line 25. Valve 33 is closed or seated since the pressure in inlet chamber 29 is not sufficient to open this valve 33 when valve 57 is open.

Valve 57 remains open until all air is purged from the suction line (not shown), pump (not shown) and input line 24 and is replaced by liquid from the reservoir pumped by the pump. While air is being purged, it is desirable to have little or no restriction on the input line 24 between the pump and the pressure control and unloader assembly 10 so as to avoid any unwanted compression of air (or gas). When liquid reaches valve 57, there results a pressure differential across aperture 32' with the pressure in inlet chamber 29 being slightly greater than the pressure in discharge chamber 31. This pressure differential causes priming button 74 to move outwards and allows the cup-shaped valve element 81 of valve 57 to drop back in its seat across aperture 32' stopping passage of liquid therethrough.

The reason this pressure differential develops across aperture 32' goes back to the physical fact that the mass per unit volume or density of a gas such as air is far less than the mass per unit volume of a liquid such as water. The force applied in both cases is determined by the well known formula of $F = \frac{1}{2}MV^2$ where $F$ = the force for foot pounds, M is equal to the mass per unit volume and V is equal to the velocity. In the case of air, the mass per unit volume (the density) is about .075 lb./ft.$^3$ while the mass of water is 65 lbs./ft.$^3$ so that, in the pressure control and unloader assembly of the invention described above for a constant velocity, the pressure developed across aperture 32' when water reaches the area instead of, say, gas will be considerable so that the presence of water will promptly cause valve 57 to close.

With valve 57 again closed, the hydraulic pressure control and unloader assembly can resume its normal functioning and pressure in valve chamber 30 can rise to its maximum value. Thus does the priming mechanism of this invention purge air from a pump system and pressure control and unloader assembly.

In summary, the present invention relates to a hydraulic pressure assembly having an integral priming device comprising a casing defining an inlet chamber, a valve chamber, a discharge chamber, a discharge outlet from said valve chamber, an input inlet to said inlet chamber, a passage between said inlet chamber and said valve chamber and a passage between said inlet chamber and said overflow chamber; a first check valve operably mounted in the passage between said inlet chamber and said valve chamber for unidirectional flow of liquid from said inlet chamber into said valve chamber; a second check valve operably mounted in the passage between the said inlet chamber and said overflow chamber normally closing such passage against flow of fluid from said inlet chamber into said overflow chamber; hydraulic pressure sensitive means responsive to pressure changes in said valve chamber and operative to open said second check valve and when pressure in said valve chamber exceeds a predetermined value; said second check valve comprising a valve plate having a circular aperture therein, a stem extending loosely through said aperture, a cup-shaped valve element mounted on said stem and having a convex wall seated in said stem and having a convex wall seated in said aperture at one side of said valve plate, a support element slidably engaging the opposite side of said valve plate adjacent said circular aperture and loosely journaling said stem, yielding means urging said stem in a direction to seat said valve element in said aperture and combined sealing and cushioning means positioned between said valve element and said stem; and means for unseating the cup-shaped valve.

The claims are:

1. A hydraulic pressure control and unloader comprising:
    (a) a casing defining an inlet chamber, a valve chamber, a discharge chamber, a discharge outlet from said valve chamber, an input inlet to said inlet chamber, and an overflow outlet from said discharge chamber,
    (b) a first check valve means operably mounted between said inlet chamber and said valve chamber for unidirectional flow of liquid from said inlet chamber into said valve chamber,
    (c) said first check valve means being operably responsive to hydraulic pressure in said inlet chamber,
    (d) a second check valve means operably mounted between said inlet chamber and said discharge chamber for unidirectional flow of liquid from said inlet chamber into said valve chamber,
    (e) said second check valve means being operably responsive to hydraulic pressure changes in said valve chamber,
    (f) said second check valve means comprising a valve plate having a circular aperture therein, a stem extending through said aperture, a cup-shaped valve element whose convex wall seats in said aperture, said valve element being axially mounted on said stem, a spider support whose hub portion loosely journals said stem whose rim portion rests upon said valve plate adjacent said circular structure and whose spokes between said hub portion and said rim portion define ports for fluid passage therethrough, yielding means urging said stem in a direction to seat said valve element in said aperture, and
    (g) means for unseating the cup-shaped valve element of said second check valve means, said unseating means being responsive to permit flow of gases from the inlet chamber of said casing through said inlet chamber and said discharge chamber and out said overflow outlet.

2. The hydraulic pressure control and unloader of claim 1 wherein said second check valve means is made operably responsive to pressure changes in said valve chamber by means of a plunger mounted in said casing which is responsive to hydraulic pressure changes in said valve chamber and which further is adapted to transmit such changes to said second check valve means, thereby to operably control liquid passage therethrough.

3. The hydraulic pressure control and unloader of claim 1 wherein hydraulic pressure in said valve chamber is transmitted through a channel in said casing to be impressed upon a plunger, said plunger being so mounted in said casing that when such plunger moves in response to hydraulic pressure changes in said valve chamber such movement is transmitted to said second check valve means, thereby to make said second check valve means operably responsive to pressure changes in said valve chamber.

References Cited in the file of this patent

UNITED STATES PATENTS 2,320,686     Waseige _____ June 1, 1943

FOREIGN PATENTS 70,269     France _____ Nov. 10, 1958